(12) United States Patent
Appireddygari Venkataramana et al.

(10) Patent No.: US 11,853,267 B2
(45) Date of Patent: Dec. 26, 2023

(54) UNINTERRUPTED FILE LEVEL BACKUP OPERATION USING A VIRTUAL OBJECT FILE QUEUE

(71) Applicant: EMC IP Holding Company LLC, Hopkinton, MA (US)

(72) Inventors: Mahesh Reddy Appireddygari Venkataramana, Bangalore (IN); Chetan Battal, Banglore (IN); Mahantesh Ambaljeri, Banglore (IN); Swaroop Shankar DH, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 446 days.

(21) Appl. No.: 16/734,277

(22) Filed: Jan. 3, 2020

(65) Prior Publication Data
US 2021/0209068 A1 Jul. 8, 2021

(51) Int. Cl.
*G06F 16/188* (2019.01)
*G06F 11/14* (2006.01)

(52) U.S. Cl.
CPC ........ *G06F 16/188* (2019.01); *G06F 11/1464* (2013.01); *G06F 2201/815* (2013.01)

(58) Field of Classification Search
CPC ............... G06F 16/188; G06F 11/1464; G06F 2201/815
See application file for complete search history.

(56) References Cited

U.S. PATENT DOCUMENTS

| 8,386,430 B1 * | 2/2013 | Myhill | G06F 11/1469 707/640 |
|---|---|---|---|
| 8,924,355 B1 * | 12/2014 | Kundzich | G06F 11/1458 707/647 |

OTHER PUBLICATIONS

Jacobi et al. ("Transactional memory Architecture and Implementation for IBM System z"; 2012 IEEE/ACM 45th Annual International Symposium on Microarchitecture) (Year: 2012).*
Mehrotra et al. ("Dealing with partial Failures in Multiple Processor Primary-Backup Systems"; Copyright 1997) (Year: 1997).*

* cited by examiner

*Primary Examiner* — Ken Hoang
(74) *Attorney, Agent, or Firm* — WOMBLE BOND DICKINSON (US) LLP

(57) ABSTRACT

Embodiments are described for performing an uninterrupted backup in a storage system responsive to an abort event. A backup agent receives a plurality of file objects to be backed up on a target device during a first backup session. The backup agent initiates a parent interrupt service routine (ISR), which generates a plurality of child ISRs. Each of the plurality of child ISRs monitors a backup state of a corresponding file object. The parent ISR generates a virtual file object queue (VFOQ) to store a current backup state of each of the plurality of file objects. When an abort occurs, the current backup state of each of the plurality of file objects is saved in a respective child ISR of that file object. During a subsequent backup session, backup of the plurality of file objects commences based on the current backup state of each of the plurality of file objects.

20 Claims, 7 Drawing Sheets

UNINTERRUPTED FILE LEVEL BACKUP OPERATION USING A VIRTUAL OBJECT FILE QUEUE

TECHNICAL FIELD

This disclosure relates to the field of backing up data of a client or host computer. More specifically, the disclosure relates to performing an uninterrupted backup in response to one or more abort events.

BACKGROUND

Data protection services include backing up data from, and restoring data to, a host or client device (collectively and individually, "client") and a backup/restore server. Data sets to be backed up or restored (collectively and individually "data transfer") may be many hundreds of terabytes, or even petabytes, of data that pass over a network between the client and server. Large scale data transfers take a long time, such that one or more events may intervene to cause a failure of the data transfer. Unexpected events can include a power outage, a network failure, failure of a read or write of one or more storage devices, and facility outages, such as disasters (earthquake, fire, etc.).

In the prior art, once a data transfer is started and is then interrupted by an abort event, the data transfer must be restarted again from the beginning, after recovery from the unexpected abort event. It is also possible, or likely, that another intervening abort event may occur after the data transfer has been restarted from the beginning, again causing the data transfer to need to be restarted from the beginning. For example, during certain seasons, weather conditions may cause more than one power outage with an intervening recovery.

It is common for large enterprises to have a backup/restore service to perform these large data transfers, to protect and restore the enterprise production data, for exactly the same reasons that cause the data transfer problem: an unexpected abort event may occur at the enterprise data facility, causing a corruption of production data and thus requiring a restore of data from a backup of the production data. The enterprise may typically have a "service level agreement" (SLA) with the backup/restore service that guarantees that a data transfer will be performed within a window of time specified in the SLA. A data transfer, interrupted by one or more abort events, may cause the backup/restore service to fail to meet the window of time specified in the SLA.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

In a first embodiment, a method of performing uninterrupted backups in view of one or more unexpected abort events includes, receiving a plurality of file objects to be backed up on a target device during a first backup session. A parent interrupt service routine (ISR) is initiated, wherein the parent ISR generates a plurality of child ISRs. Each of the plurality of child ISRs monitors a backup state of a corresponding file object among the plurality of file objects. A virtual file object queue (VFOQ) is generated to store a current backup state of each of the plurality of file objects. In response to detecting an abort of the first backup session, the current backup state of each of the plurality of file objects is saved in a respective child ISR of that file object. During a subsequent backup session, backup of the plurality of file objects is resumed based on the current backup state of each of the plurality of file objects as indicated by the VFOQ.

In an embodiment, a non-transitory computer readable medium can store executable instructions that, when executed by a processing system having at least one hardware processor, can perform any of the functionality described above.

In yet another embodiment, a processing system having at least one hardware processor is coupled to a memory programmed with executable instructions which, when executed by the processing system, perform any of the functionality described above.

Some embodiments described herein can include one or more application programming interfaces (APIs) in an environment with calling program code interacting with other program code being called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

Figure 1:
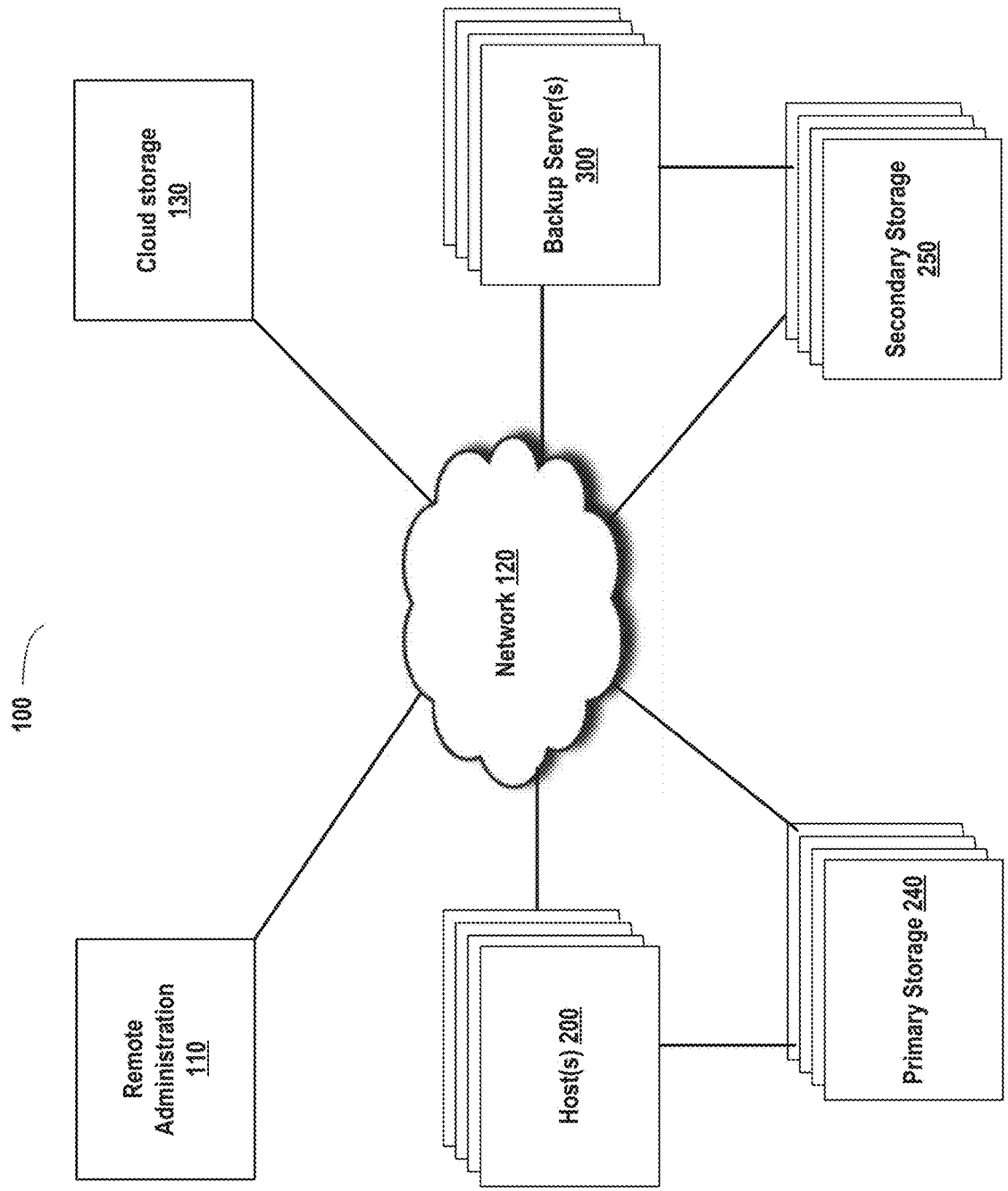
FIG. 1 illustrates, in block diagram form, an overview of a computing infrastructure that can perform uninterrupted backups in view of one or more unexpected abort events in a storage system, in accordance with some embodiments.

FIG. 1 illustrates, in block diagram form, an overview of a computing infrastructure 100 that can perform uninterrupted backups and restores ("data transfers") in view of one or more unexpected abort events in a storage system, in accordance with some embodiments. In this disclosure, an uninterrupted data transfer comprises a data transfer that may be aborted due to an unexpected abort event, and can be resumed from the point of abort, after recovery from the abort event, without restarting the data transfer from the beginning. For example, if a data transfer (either backup or restore) of a client data set is 10 terabytes, and 3 terabytes have been backed up when an unexpected abort event is received, then after the cause of the abort event is remedied (e.g. network back up, power back on, failed disk replaced, etc.) then the data transfer can complete the remaining 7 terabytes of data transfer without having to restart the data transfer from the beginning.

The computing infrastructure 100 may perform uninterrupted backups in view of one or more abort events. Abort events can include a power outage, a facility disaster (earthquake, tornado, flood, fire, e.g.) or a failure of equipment such as a communication network failure, a read or write error of a storage device, failed processor, and the like.

Computing infrastructure 100 can include remote administration 110, one or more hosts or clients 200, a cloud storage service 130, one or more primary storages 240 that may hold client production data, one or more backup servers 300, and one or more secondary storages 250, all interconnected by network 120.

Hosts 200, storage appliance(s) 240 and 250, backup servers 300, and remote administration module 110 can also be coupled to a one or more cloud storage services 130 which can act as a secondary storage 250. Host(s) 200 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 200 may be a primary storage system (e.g., local data center) that provides storage to other local clients, which may periodically back up the content stored therein to a backup storage system (e.g., a disaster recovery site or system), such as backup server 300 or secondary storage system 250. Network 120 may be any type of networks such as a local area network (LAN), a wide area network (WAN) such as the Internet, a fiber network, a storage network, or a combination thereof, wired or wireless. Components of an example host device 200 can be as described with reference to FIG. 2 and FIG. 6, below.

Host 200 can backup or restore one or more application data sets of a virtual machine (VM) executing on the host 200 to, or from, the backup server 300. A virtual machine on host 200 can include a backup application agent, a restore agent, and a hypervisor, all of which can communicate with a backup application on backup server 300, to facilitate efficient backups of application data on one or more VM's. Backup server 300 can, in turn, opt to store all or a portion of the backed up application data sets to cloud storage 130 or to secondary storage 250. Applications that generate client production data can be e.g., SAP, DB2, SQL Server, Exchange, Sharepoint®, Microsoft® Exchange®, or other application. An application can have its own backup component that facilitates backup of the application to secondary storage 250, backup server 300, or a cloud storage 130. The backup component can have a backup application programming interface (API) that can be called to invoke a backup of the application data set and/or to return metrics about a backup of the application data set.

A primary storage 240 or a secondary storage 250 can comprise a large number of disks, such as EMC® VMAX 400K with up to 5,760 hard drives. In an embodiment, one or more primary storages 240 can form a part of a host 200. In an embodiment, a virtual disk can be a raw virtual disk mapped to a one or more portions of storage. A portion of storage can comprise one or more logical unit numbers (LUNs) of a single physical disk or one or more physical disks in a primary storage 240. In an embodiment, a raw disk can be configured to use virtual mapping to one or portions of storage, such that the portions of storage can be snapshot before a backup. In an embodiment, a raw virtual disk can be physically mapped to one or more portions of storage.

Figure 2:
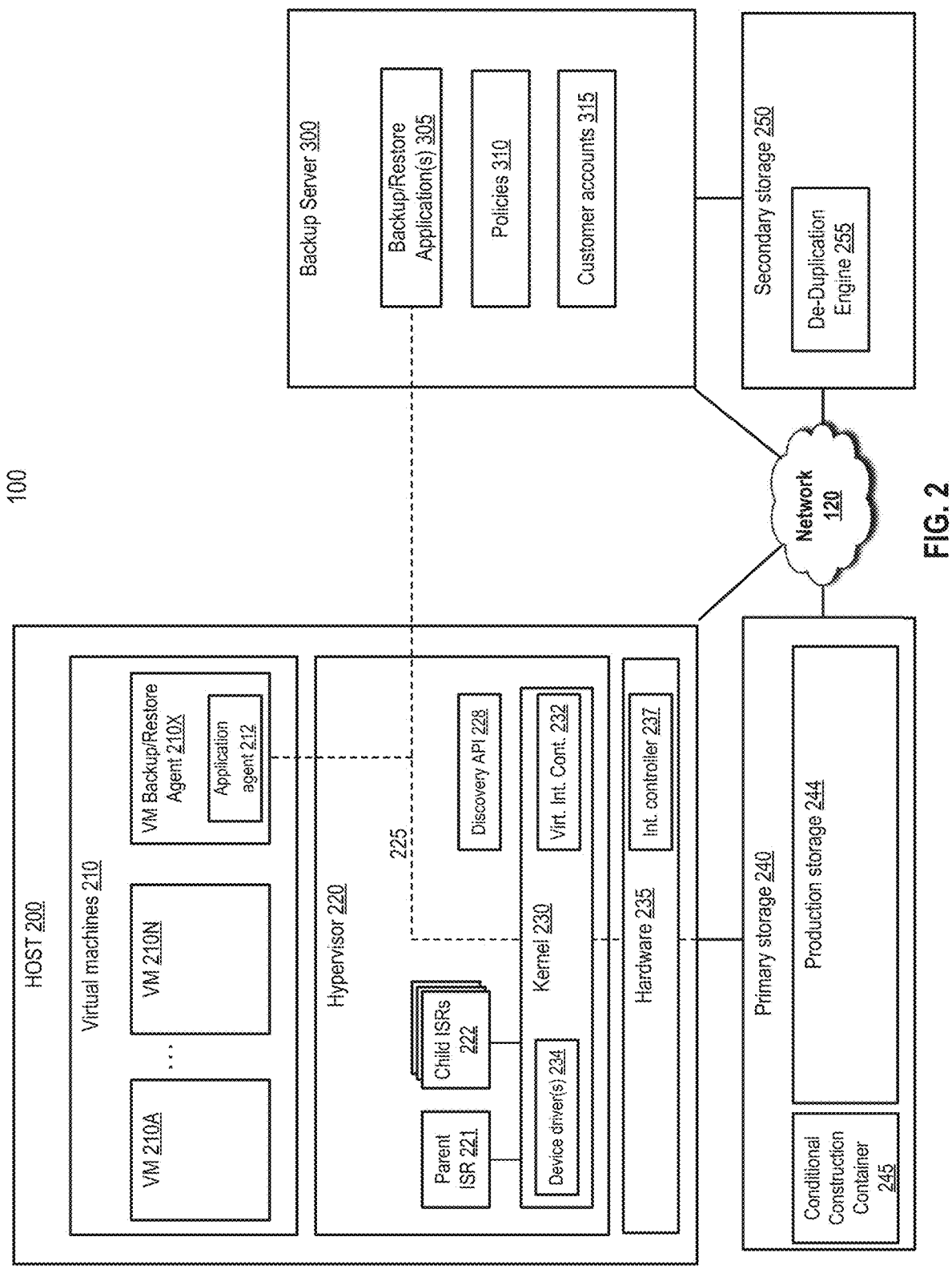
FIG. 2 illustrates, in block diagram form, a detailed view of a computing infrastructure that can perform uninterrupted backups in view of one or more unexpected abort events in a storage system, in accordance with some embodiments.

A primary storage 240 can include a conditional construction container (CCC) 245 (shown in FIG. 2). CCC 245 can be one or more areas of storage, such as one or more logical unit numbers (LUNs), one or more containers of storage, one or more disks, or other preallocated area of storage. CCC 245 can act as a staging area for disk snapshots for backing up data, or for storing data to be restored from a previous backup of client production data. In a restore example, CCC 245 can be used to receive data blocks in a restore operation and to prepare the received blocks in a manner that enables a quick cut over from the CCC 245 copy of the restored data blocks to overwriting existing production data. In addition, CCC 245 can hold all data to be restored in a restore operation, so that no data received by CCC 245 in a restore operation is applied to production data until the CCC 245 receives all data to be restored and is ready to cut over the CCC 245 to overwrite the production data to be restored.

A backup of a client application data set from a primary storage 240 to a secondary storage 250, or to backup server 300, can be initiated by a user of the client, a remote administrator 110, or by a backup policy on backup server 300. In an embodiment, scheduled backups can be initiated by backup server 300. In an embodiment, the backup can be initiated by a backup application on backup server 300, or by a backup proxy on another machine. For example, a backup proxy can be implemented on as a virtual machine on a host machine. Backup server 300 can initiate a backup or restore of a client application data set on host 200 in accordance with one or more backup policies each associated with a client and an application on the client/host 200. For example, a policy for a virtual machine on host 200 can be that a full backup of a Microsoft® Sharepoint® database is performed every Friday evening.

FIG. 2 illustrates, in block diagram form, a detailed view of a computing infrastructure that can perform uninterrupted backups in view of one or more unexpected abort events in a storage system, in accordance with some embodiments.

A virtual infrastructure 100 can include one or more host computing systems 200 ("host"), a backup server 300, a primary storage 240, and a secondary storage 250. In an embodiment, these components can be communicatively interconnected via network 120. Host 200 can have a plurality of virtual machines 210, including VM 210A through VM210N, where N can be a positive integer. In an embodiment, VMs 210 can include a backup/restore agent or proxy ("agent") 210X implemented as a VM. VM backup/restore agent 210X can further include an application agent 212 that facilitates backup and restore of production data generated by one or more particular applications.

Network 120 can be any type of network such as a local area network (LAN), a wide area network (WAN) such as Internet, a corporate intranet, a metropolitan area network (MAN), a storage area network (SAN), a bus, or a combination thereof, wired and/or wireless networks.

A client having an application with an application data set to be backed up can be host 200 or a virtual machine 210 on the host 200 (interchangeably, "client"). A host 200 can include physical hardware 235, a virtual machine manager or "hypervisor" 220, one or more virtual machines (VM) 210, or one or more virtual proxy nodes (VP) 210X.

Physical hardware 235 can include a physical basic input-output system (BIOS), one or more physical disks or storage devices, one or more network interface cards (NIC), memory, and one or more hardware processors or CPUs, interrupt controller(s) 237, and the like. Host 200 can be implemented in accordance with the computing system described with reference to FIG. 6, below.

Host 200 can include hypervisor 220 that provides a virtualization abstraction layer to support one or more virtual machines (VMs) 210 on host 200. Host 200 can further include virtual hardware, such as virtual interrupt controller 232, that can correspond to physical hardware 235, such as a virtual BIOS, one or more virtual storage devices (VDISK), one or more virtual network interface cards (VNIC), virtual memory, and one or more virtual processors or CPUs.

Hypervisor 220 can include a communication channel 225 between VM backup/restore agent 210X, application agent 212, kernel 230, hardware 235, primary storage 240, and a backup/restore application 304 on backup server 300. Communication channel 225 can be implemented using function calls to/from a framework or application programming interface, interprocess communication, communication by interrupts and mailboxes, and the like. Kernel 230 can perform operating system functions that support virtualization in hypervisor 220, perform input/output using the one or more device drivers 234, and other operating system services. One or device drivers 234 in kernel 230 can be used to interface the hypervisor 220 to connected hardware 235.

VM backup/restore agent 210X can include an application agent 212. VM backup/restore agent 210X can receive a backup/restore policy 310 (collectively and individually, "backup policy") from backup server 300 via backup/restore application 305. The backup policy 310 can indicate a frequency of backup, type of backup, the application data whose data is to be backed up, or restored, and other backup or restore parameters. Application agent 212 can configure the backup/restore functionality using the backup policy 310. For example, backup policy 310 can state, "for this client, for application Microsoft® Exchange®, perform a full backup once per week, perform an incremental backup every 6 hours, and backup the application data to cloud storage."

In response to a request, e.g. from backup application 305, to perform a backup in accordance with a backup policy 310, application agent 212 can quiesce the state of the application, e.g. Microsoft® Exchange®, and cause a volume snapshot service (VSS) snapshot to be taken of Microsoft® Exchange® application state. The VSS snapshot records the application data state even while the application is in use. A VSS snapshot is a read-only point-in-time copy of a volume. VSS snapshots allow the creation of consistent backups of a volume, ensuring that the contents do not change and are not locked while the backup is being made.

The VSS snapshot can be a part of quiescing the application state. However, the application state can only be quiesced for a limited period of time which is much shorter than the time it takes to move the application data to secondary storage 250. Application agent 212 can also cause VM backup proxy 210X to take snapshot 245 of the application data on the production storage 244. Snapshot 245 is stored on the same production disks 244 that store the application data for which the snapshot 245 was taken. After the virtual snapshot is generated, and application agent 212 has been notified that the virtual snapshot has been generated, then application agent 212 can resume the application.

VM 250 can further include an application discovery application programming interface (API) 228 that can discover one or more applications that run on the VM 210. Each application can include a backup API that interfaces to the application data generated by the application. Backup API also access meta data about application data that has been backed up, or is ready to be backed up. Meta data can indicate a current size of the application data set, a percentage of the application data set that has changed since a last backup, a number of inputs and outputs (I/O's) performed on the data set since the last backup, and other information about one or more backups of the application data set.

In an embodiment, host 200 can further include a storage manager or storage controller (not shown) configured to manage storage resources of host 200, such as, for example, storage space and processing resources (e.g., processor, memory, network resources). The storage manager or controller may be accessed by an remote administrator 110 (as shown in FIG. 1) remotely via a management or configuration interface (not shown). The remote administrator 110 can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines 210 (e.g., virtual storage systems) managed by a hypervisor 220. Each of the virtual machines can be provisioned to provide a particular type of storage services (e.g., file-based, block-based, object-based, or HDFS) to a client based on a storage policy or service level agreement associated with that particular client as part of software-defined storage services.

Primary storage 240 can include any type of server or cluster of servers. For example, primary storage 240 may be a storage server used for any of various different purposes, such as to provide multiple users with access to shared data and/or to back up mission critical data. Primary storage 240 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Primary storage 240 may have a distributed architecture, or all of its components may be integrated into a single unit. Primary storage 240 may be implemented as part of a primary storage available from EMC® Corporation of Hopkinton, Massachusetts, such as the EMC® VMAX family of storage appliances.

Primary storage 240 can include and plurality of storage units (not shown) which may interconnected inside the primary storage, or as a backplane, via a bus and/or a network. Storage units can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units may also be combinations of such devices. In the case of disk storage media, the storage units may be organized into one or more volumes of Redundant Array of Inexpensive Disks (RAID).

Primary storage 240 can further include raw disk mapping files that map a virtual disk of a virtual machine 210 to one or more portions of storage on the primary storage 240. A portion of a primary storage 240 can be a logical unit number (LUN). Raw disk mapping to one or more portions of storage can be physical mapping or a virtual mapping. Primary storage 240 can be coupled to backup server 300 and/or secondary storage 250 via network 120.

Secondary storage 250 can be coupled to backup server 300 either as direct attached storage (DAS) or as network attached storage (NAS) via network 120. Secondary storage 250 may include any type of server or cluster of servers. For example, secondary storage 250 may be a storage server used for any of various different purposes, such as to provide multiple users with access to shared data and/or to back up mission critical data. Secondary storage 250 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, a tape backup device, or essentially any other type of data storage device. Secondary storage 250 may have a distributed architecture, or all of its components may be integrated into a single unit. Secondary storage 250 may be implemented as part of an archive and/or backup storage system such as a de-duplication storage system available from EMC® Corporation of Hopkinton, Massachusetts.

Secondary storage 250 can include, but is not limited to, deduplication storage engine 255, and one or more storage units (not shown) communicatively coupled to each other. Storage units may be implemented locally (e.g., single node operating environment) or remotely (e.g., multi-node operating environment) via a bus and/or a network. Storage units can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units may also be combinations of such devices. In the case of disk storage media, the storage units may be organized into one or more volumes of Redundant Array of Inexpensive Disks (RAID). Note that in one embodiment, backup server 300 and secondary storage 250 are integrated into one single system.

Optional deduplication storage engine 255 is configured to segment data files into multiple segments according to a variety of segmentation policies or rules. Deduplication storage engine 255 only stores a segment in a storage unit if the segment has not been previously stored in the storage unit. In the event that a segment has been previously stored, metadata about the segment is stored enabling the reconstruction of a file using the previously stored segment. As a result, segments of data files are stored in a deduplicated manner, either within each of storage units or across at least some of the storage units. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

Backup server 300 can be a computing system as described with reference to FIG. 6, below. Backup server 300 can comprise one or more computing systems. Backup server 300 can include, but is not limited to, a backup/restore application 305, and one or more policies 310, and one or more customer accounts 315. Customer accounts 315 can store service level agreement (SLA) data for one or more customers. Backup policies 310 can contain an SLA for particular users or groups of users of the customer that specify how often certain application data is to be backed up, the type of the backup to perform (incremental or full), and the tier of storage where the backup data is to be stored. A tier of storage can be, e.g., tier 1 storage having fast access, tier 2 storage, e.g. cloud storage, which may be deduplicated and travel across a network for access, tier 3, e.g. long term storage which may comprise tapes, read-only disks, or other slower storage devices.

A backup server 300 operating as a storage system may include or represent any type of servers or a cluster of one or more servers (e.g., cloud servers 130). For example, storage system 300 may be a storage server used for various different purposes, such as to provide multiple users or client systems with access to shared data and/or to back up (or restore) data (e.g., mission critical data). Storage system 300 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Backup/restore application 305 can invoke logic in application agent 212 to discover the applications that may be installed and/or running on VM 210. Applicant agent can call one or more application programming interfaces on hypervisor 220 to determine changes to application data since a last backup.

Backup server 300 can coordinate with primary storage 240, secondary storage 250, and host computing system 200 to run various backup and/or restore operations. Backup/restore application 305 may perform both backup and restore functions, invoke discovery APIs within hypervisor 220, and within VMs 210. Backup/restore application 305 can read and write backup accounts 315 and backup policies 310 on backup server 300, or across multiple storage devices accessible to backup server 300.

Customer accounts 315 can store identifying information about a particular client, such as a textual name, a network address, a universally unique client identifier (UUID), and biographic information about the individual and/or company that owns the client. Customer accounts 315 can include login information to backup server 300 for users of virtual machines 250 and administrators who may access backup server 300 via remote administration module 110. Customer accounts 315 can be aggregated by company, by region, or other metric, such that backup policies 335 can be generated for one or more customer accounts 315 by company, by region, or other metric, such as by data center or business operating group.

Policies database 310 can include, for each application on a client, a backup policy including a backup policy type (by application, by I/O change rate, by user rule) and a protection level for the application data. A protection level can indicate a frequency that application data should be backed up. A protection level can have a textual name to indicate a frequency or range of frequencies for backup. For example, platinum protection level may indicate a backup every 15 minutes and bronze protection level may indicate a backup once each data for a particular application on a client/VM 210. Backup policies 310 can specify particular applications whose data gets backed up from a virtual machine 210, retention policy for the backed up data, whether the backups are incremental, full, image, or an alternating or interleaved combination of these. Backup policies 310 can further define whether data is deduplicated before storage, how quickly the storage can be retrieved for access by a virtual machine, and other policy parameters.

FIGS. 3A through 3D illustrate, in block diagram form, states of a backup system that can perform uninterrupted backups in view of one or more unexpected abort events in a storage system, in accordance with some embodiments.

Figure 3A:
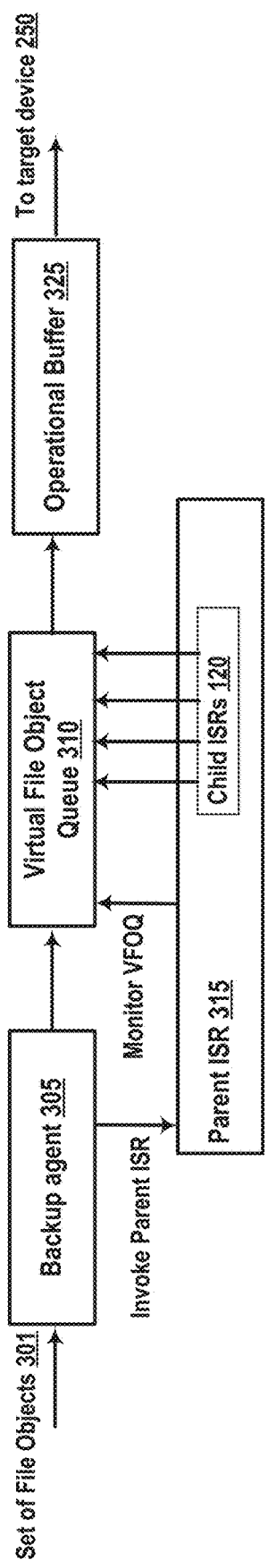
FIGS. 3A through 3D illustrates, in block diagram form, states of a backup system that can perform uninterrupted backups in view of one or more unexpected abort events in a storage system, in accordance with some embodiments.

FIG. 3A illustrates a first portion of a process for backing up data from host device 200 to target storage, such as secondary storage 250. The backup agent 305 can be backup/restore agent VM 210X as shown in FIG. 2. Backup agent 305 receives a first plurality, or first set, of file objects 301 that are to be backed up on target storage, thus triggering a first backup session. Although the example of FIGS. 3A-3D is described with respect to receiving the set of file objects 301 in burst, in some embodiments they may also be received sequentially. Concurrently with receiving the first set of file objects 301, backup agent 305 may invoke the parent interrupt service routine (ISR) 315. The parent ISR 315 may be any appropriate existing ISR of the host 200, or may be an ISR specifically designed for performing the functions described herein. The parent ISR 315 may monitor the set of file objects 301 by generating one or more child ISRs 320 for each file object and generating a virtual file where each file object may be represented in a "queue" along with an indication of the file object's current backup state. The virtual file may be referred to herein as a virtual file object queue (VFOQ) 310. The child ISR(s) 320 for each file object may track the backup state of that file object during the first backup session and update its representation in the VFOQ 310 with its current backup state. Because the backup states of each file object in the VFOQ 310 is contained in a single file, the parent ISR 315 may monitor the VFOQ 310 to track the backup state of each file object simultaneously. The parent ISR 315 may also begin polling for occurrence of an unexpected abort event.

During the first backup session, backup agent 305 may perform a backup operation on each of the set of file objects 301. A file object may transition through different backup states during the backup operation. In some embodiments, a backup state may refer to a particular process(es) of the backup operation, and a current backup state may refer to a process of the backup operation that a file object is undergoing. The backup operation may comprise a plurality of processes. For example, the backup agent 305 may encrypt a file object to generate a secure file, append a cyclic redundancy check (CRC) or other security check to the file object, and perform deduplication, for example. As a file object undergoes each of these backup processes, it may be said to be in a backup state corresponding to that process (e.g., an encryption state, a CRC check state). The above states are for example only and a file object may be in any state corresponding to a process that is part of any appropriate protocol (e.g., the TCP/IP protocol) being utilized by the host device 200 to backup the set of file objects. As a file object transitions through the different processes of the backup operation, its corresponding child ISR 320 may update its representation in the VFOQ 310 with its current backup state. Once the backup agent 305 has finished the backup operation on the file object, it may transmit the file object to the operational buffer 325, which may act as a temporary place holder for file objects before they reach the target device (which may immediately begin consuming the file object). In this way, aborts that occur during the time between the backup agent completing the last backup process on the file object and the target device receiving the file object(s) may be accounted for. Upon receiving an acknowledgement that the target storage has received the file object, the child ISR may update a current backup state of the file object in the VFOQ 310 to indicate that the file object has been successfully backed up. For example, the child ISR may update the particular file object's current backup state as "complete," in the VFOQ 310.

Figure 3B:
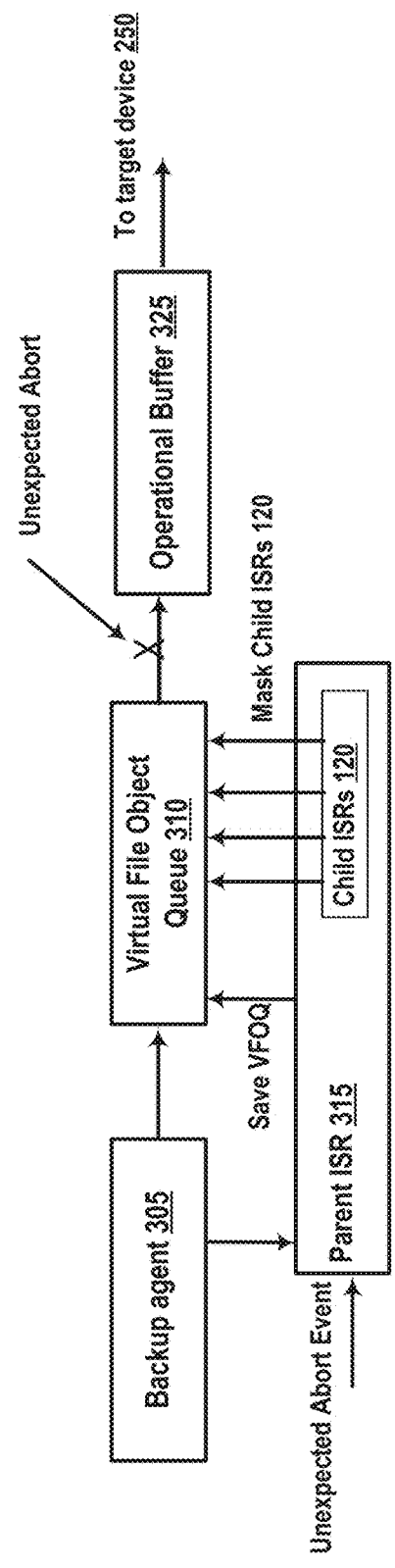

Referring now to FIG. 3B, parent ISR 315 may detect an unexpected abort event (e.g., in response to polling for such an event). In response to detecting the unexpected abort event, parent ISR 315 may instruct each of the child ISRs 320 to save the current backup state of their respective file object at the time of the abort in memory (e.g., a cache memory of host device 200). When a child ISR 320 saves the current backup state of its respective file object, this may be referred to as "masking" the child ISR. In addition, the parent ISR 315 may save the current state of the VFOQ 310 (e.g., in cache memory of host device 200) as a whole at the time of the abort and utilize the VFOQ 310 as a locked file to track the current backup state of each file object. When the parent ISR 315 saves the current state of the VFOQ 310, this may be referred to as "masking" the parent ISR 315. Each child ISR 320 may inform the parent ISR 315 when they are successfully masked due to the abort, and the parent ISR 315 may inform the backup agent 305 of this and deactivate itself.

Figure 3C:
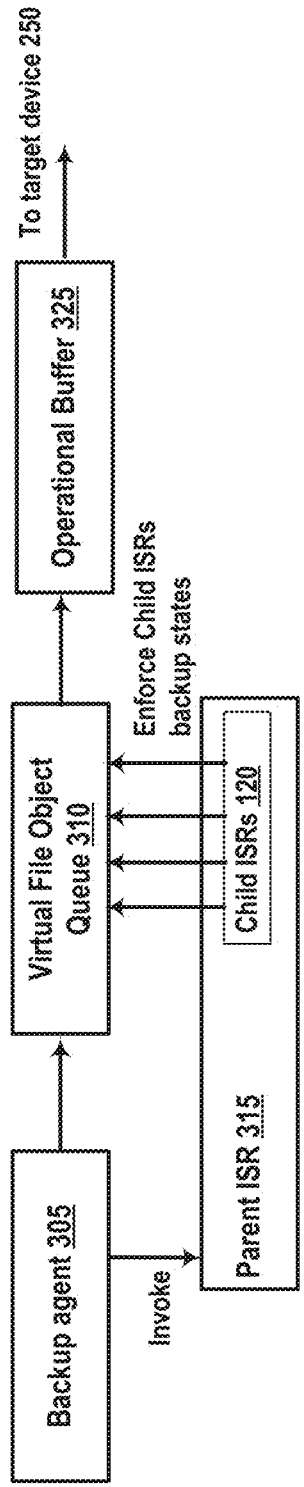

With reference to FIG. 3C, after the abort event condition is remedied, a subsequent backup session may be triggered which may resume from the point at which the unexpected abort event occurred. The backup agent 305 may invoke the parent ISR 315 once again, which is still masked from the previous abort. The parent ISR 315 may first determine the current backup state of each file object by analyzing the VFOQ 310 to determine the backup state each file object was in when the unexpected abort event was detected. The parent ISR 315 may identify file objects that have not completed the backup operation based on their current backup state as indicated by the VFOQ 310 and instruct the child ISRs 320 corresponding to those file objects to enforce their current backup state on the corresponding file object, which may be located on the operational buffer 325. Each child ISR 120 is re-entrant in nature, meaning that if another unexpected abort event is received while the state re-enforcement is in progress, the child ISR 120 would notify the parent ISR 315 about the received abort event, and could retry resumption of the backup session after some time.

Figure 3D:
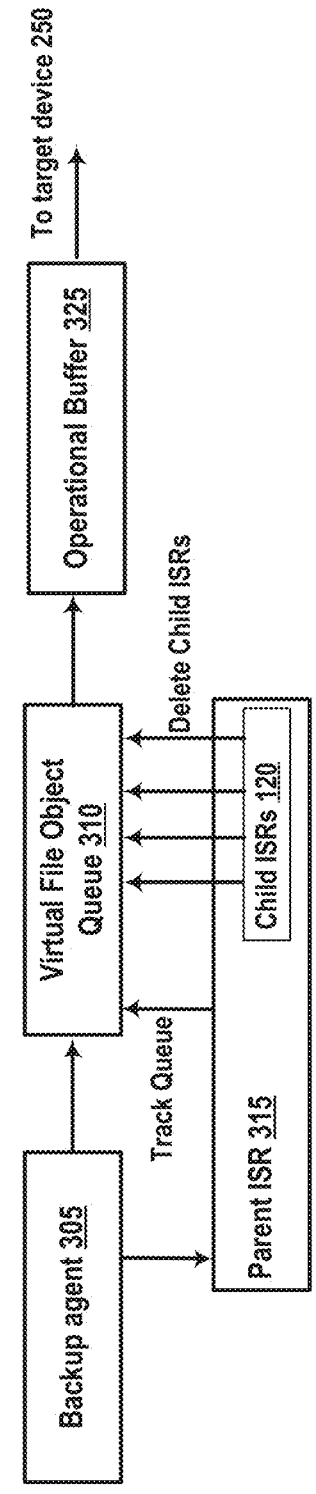

With reference to FIG. 3D, with the state of the interrupted backup session restored by the child ISRs 120, backup agent 305 can resume performing backup processes on the file objects that have not completed the backup operation. When all child ISRs 120 indicate that their corresponding file objects have been backed up (e.g., responsive to receiving an acknowledgement that the target storage has received them), then the subsequent backup session has completed and parent ISR 315 may notify backup agent 305 that backup is complete. When a child ISR 120 indicates (e.g., in VFOQ 310, as discussed above) that its corresponding file object has been successfully backed up, the parent ISR 315 may delete that child ISR 120 in response.

Figure 4:
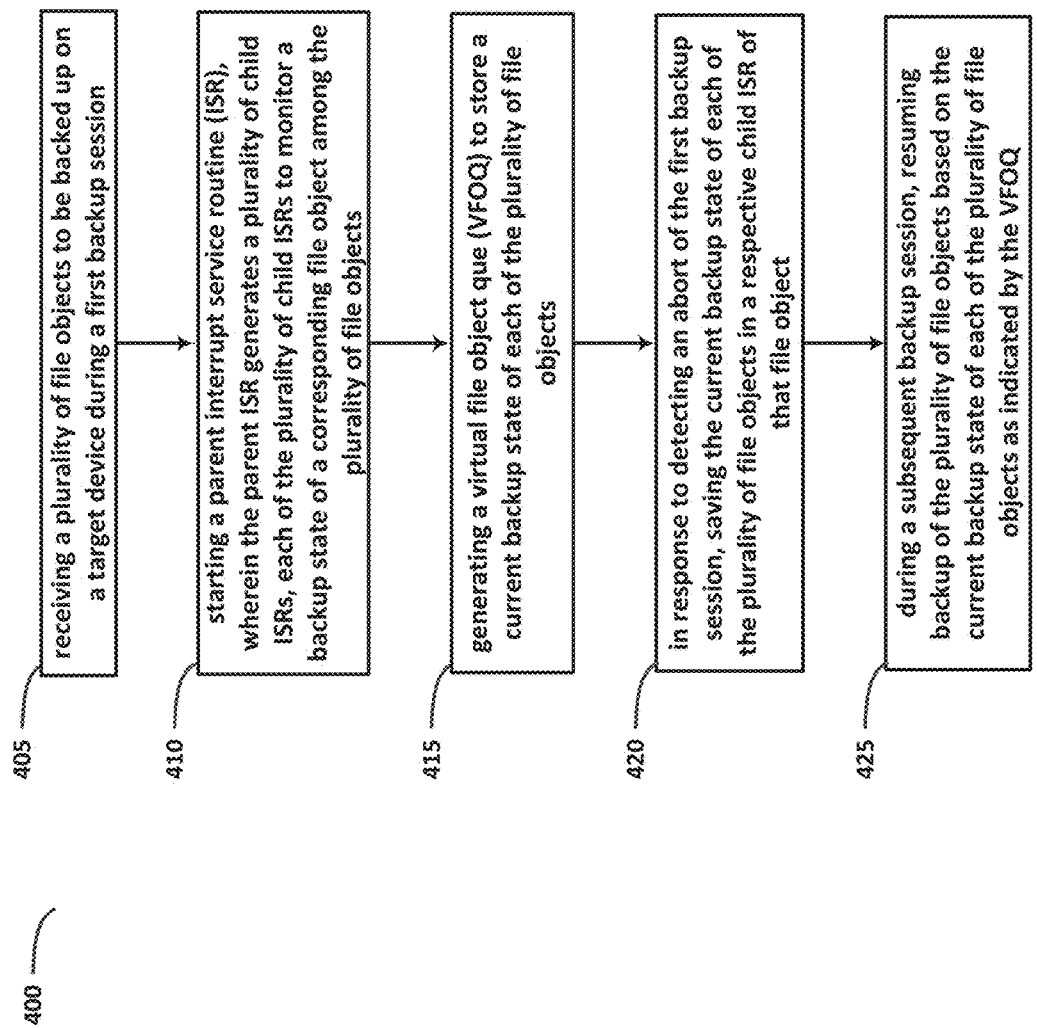
FIG. 4 illustrates, in block diagram form, a method of performing an uninterrupted backup in view of a one or more unexpected abort events in a storage system, in accordance with some embodiments.

FIG. 4 illustrates, in block diagram form, a method 400 of performing an uninterrupted backup in view of an unexpected abort event in a storage system, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by host device 200 (e.g., as illustrated in FIG. 2).

Referring also to FIGS. 3A-3D, in operation 405, backup agent 305 receives a first plurality, or first set, of file objects 301 that are to be backed up on target storage, thus triggering a first backup session. In operation 410, concurrently with receiving the first set of file objects 301, backup agent 305 may invoke the parent interrupt service routine (ISR) 315. The parent ISR 315 may be any appropriate existing ISR of the host 200, or may be an ISR specifically designed for performing the functions described herein. The parent ISR 315 may monitor the set of file objects 301 by generating one or more child ISRs 320 for each file object. The child ISR(s) 320 for each file object may track the backup state of that file object during the first backup session. The parent ISR 315 may also begin polling for occurrence of an unexpected abort event. In operation 415, the parent ISR 315 may generate a virtual file where each file object may be represented in a "queue" along with an indication of the file object's current backup state. The virtual file may be referred to herein as a virtual file object queue (VFOQ) 310. Because the VFOQ 315 is contained in a single file, the parent ISR 315 may utilize it to track the backup state of each file object simultaneously. As a file object transitions through the different processes of the backup operation, its corresponding child ISR 320 may update its representation in the VFOQ 310 with its current backup state.

In operation 420, parent ISR 315 may detect an unexpected abort event, in response to polling for such an event. In response to detecting the unexpected abort event, parent ISR 315 may instruct each of the child ISRs 320 to save the current backup state of their respective file object at the time of the abort in memory (e.g., a cache memory of host device 200). When a child ISR 320 saves the current backup state of its respective file object, this may be referred to as "masking" the child ISR. In addition, the parent ISR 315 may save the current state of the VFOQ 310 as a whole at the time of the abort and utilize the VFOQ 310 as a locked file to track the current backup state of each file object. When the parent ISR 315 saves the current state of the VFOQ 310, this may be referred to as "masking" the parent ISR 315. Each child ISR 320 may inform the parent ISR 315 that they have been masked due to the abort, and the parent ISR 315 may inform the backup agent 305 of this and deactivate itself.

In operation 425, after the abort event condition is remedied, a subsequent backup session may be triggered which may resume from the point at which the unexpected abort event occurred. The backup agent 305 may invoke the parent ISR 315 once again, which is still masked from the previous abort. The parent ISR 315 may first determine the current backup state of each file object by analyzing the VFOQ 310 to determine the backup state each file object was in when the unexpected abort event was detected. The parent ISR 315 may identify file objects that have not completed the backup operation based on their backup state as indicated by the VFOQ 310 and instruct the child ISRs 320 corresponding to those file objects to enforce their current backup state on the corresponding file object, which may be located on the operational buffer 325. Each child ISR is re-entrant in nature, meaning that if another unexpected abort event is received while the state re-enforcement is in progress, the child ISR would notify the parent ISR 315 about the received abort event, and could retry resumption of the backup session after some time.

With the state of the interrupted backup session restored by the child ISRs 120, backup agent 305 can resume performing backup processes on the file objects that have not completed the backup operation. When all child ISRs 120 indicate that their corresponding file objects have been backed up (e.g., responsive to receiving an acknowledgement that the target device 250 has received them), then the subsequent backup session has completed. Parent ISR 315 may notify backup agent 305 that backup is complete. As each file object is received at the target device 250, an acknowledgement for that file object is sent to the parent ISR 315 (as discussed hereinabove), which may delete the child ISRs 320 corresponding to that file object in response.

Figure 5:
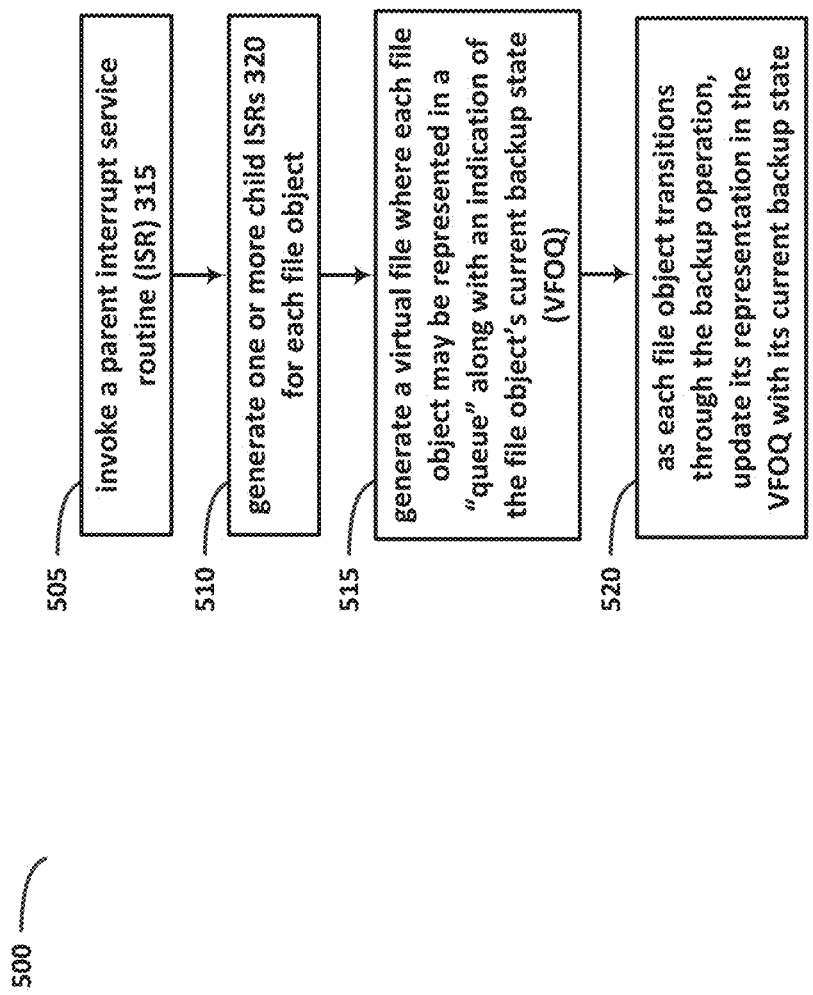
FIG. 5 illustrates, in block diagram form, a method of monitoring the backup state of a plurality of file objects, in accordance with some embodiments.

FIG. 5 illustrates, in block diagram form, a method 500 of monitoring the backup state of a plurality of file objects, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by host device 200 (e.g., as illustrated in FIG. 2).

At operation 505, concurrently with receiving the first set of file objects 301, backup agent 305 may invoke a parent interrupt service routine (ISR) 315. At operation 510, the parent ISR 315 may generate one or more child ISRs 320 for each file object. The child ISR(s) 320 for each file object may track the backup state of that file object during the first backup session. In operation 515, the parent ISR 315 may generate a virtual file where each file object may be represented in a "queue" along with an indication of the file object's current backup state. The virtual file may be referred to herein as a virtual file object queue (VFOQ) 310. Because the VFOQ 315 includes the backup state of each of the plurality of file objects in a single file, the parent ISR 315 may utilize it to track the backup state of each file object simultaneously. At operation 520, as a file object transitions through the different processes of the backup operation, its corresponding child ISR 320 may update its representation in the VFOQ 310 with its current backup state.

Figure 6:
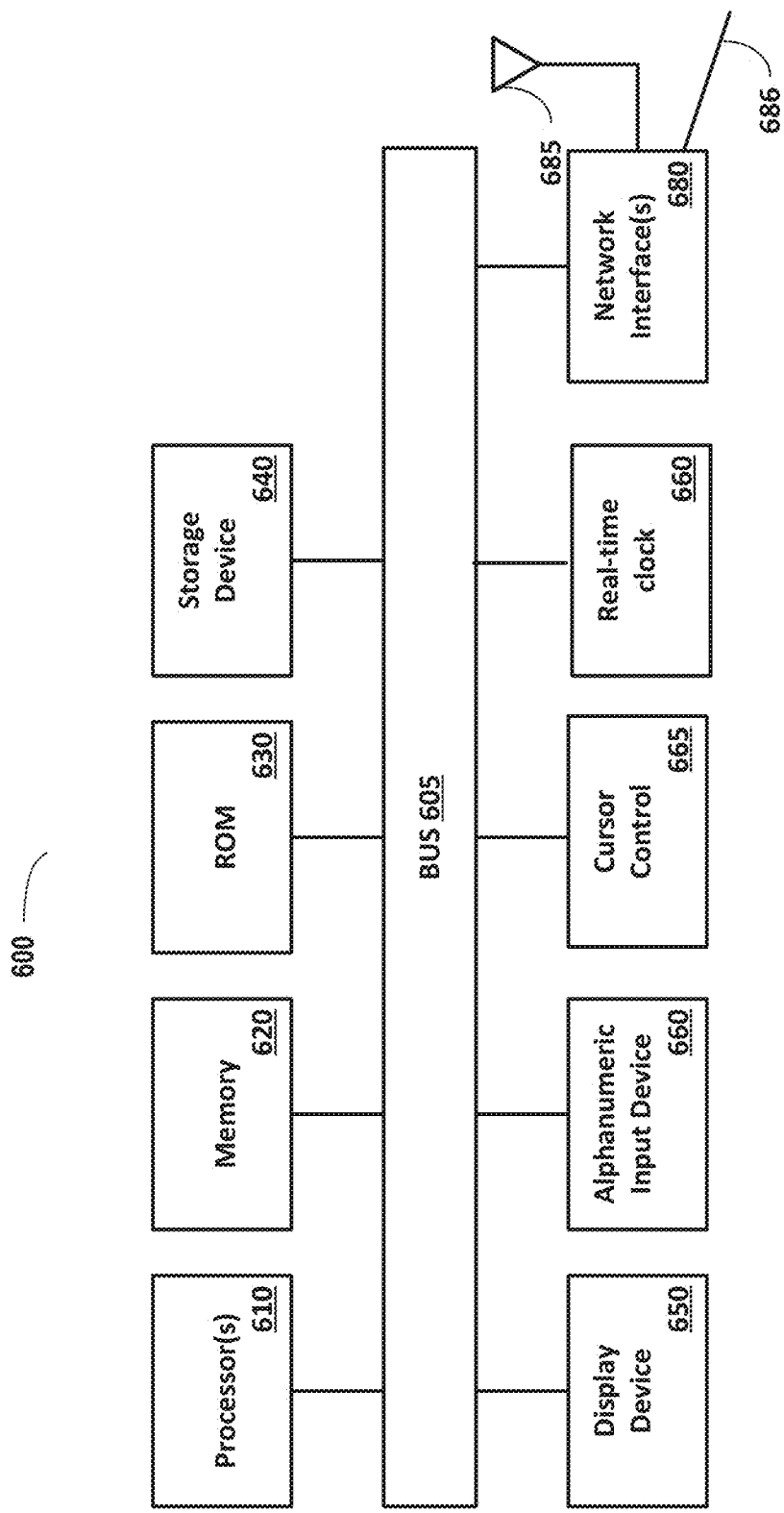
FIG. 6 illustrates, in block diagram form, a representative computing system upon which the enclosed functionality can be implemented.

FIG. 6 is a block diagram of one embodiment of a computing system 600. The computing system illustrated in FIG. 6 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 6 may be used to provide a computing device and/or a server device.

Computing system 600 includes bus 605 or other communication device to communicate information, and processor 610 coupled to bus 605 that may process information.

While computing system 600 is illustrated with a single processor, computing system 600 may include multiple processors and/or co-processors 610. Computing system 600 further may include random access memory (RAM) or other dynamic storage device 620 (referred to as main memory), coupled to bus 605 and may store information and instructions that may be executed by processor(s) 610. Main memory 620 may also be used to store temporary variables or other intermediate information during execution of instructions by processor 610.

Computing system 600 may also include read only memory (ROM) 630 and/or other static, non-transitory storage device 640 coupled to bus 605 that may store static information and instructions for processor(s) 610. Data storage device 640 may be coupled to bus 605 to store information and instructions. Data storage device 640 such as flash memory or a magnetic disk or optical disc and corresponding drive may be coupled to computing system 600. Any, or all, of memory 620, ROM 630, or data storage device 640 can be programmed with executable instructions that, when executed by processor(s) 610 perform the functionality described herein, including by not limited to, a virtual machine, a host, hypervisor, VM backup proxy 210, I/O filter driver 222 FW, I/O filter driver 232, snapshot logic, backup agent 305, de-duplication engine 255, and other claimed functionality.

Computing system 600 may also be coupled via bus 605 to display device 650, such as a light-emitting diode display (LED), or liquid crystal display (LCD), to display information to a user. Computing system 600 can also include an alphanumeric input device 660, including alphanumeric and other keys, which may be coupled to bus 605 to communicate information and command selections to processor(s) 610. Another type of user input device is cursor control 665, such as a touchpad, a mouse, a trackball, or cursor direction keys to communicate direction information and command selections to processor(s) 610 and to control cursor movement on display 650. Computing system 600 may further include a real-time clock 670. The real-time clock 670 may be used for generating date/time stamps for data records, computing elapsed time, and other time-keeping functions. A real-time clock 670 can be a battery-backed chipset with a settable date and time. Alternatively, a real-time clock 670 may include logic to retrieve a real-time from a network source such as a server or an Internet server via network interfaces 680, described below.

Computing system 600 further may include one or more network interface(s) 680 to provide access to a network, such as a local area network. Network interface(s) 680 may include, for example, a wireless network interface having antenna 685, which may represent one or more antenna(e). Computing system 600 can include multiple wireless network interfaces such as a combination of WiFi, Bluetooth® and cellular telephony interfaces. Network interface(s) 680 may also include, for example, a wired network interface to communicate with remote devices via network cable 687, which may be, for example, an Ethernet cable, a coaxial cable, a fiber optic cable, a serial cable, or a parallel cable.

In one embodiment, network interface(s) 680 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 680 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. A method comprising:
receiving a plurality of file objects to be backed up on a target device during a first backup session;
starting a parent interrupt service routine (ISR), wherein the parent ISR generates a plurality of child ISRs, each of the plurality of child ISRs to monitor a backup state of a corresponding file object among the plurality of file objects;
generating a virtual file object queue (VFOQ) to store a current backup state of each of the plurality of file objects;
in response to detecting an abort of the first backup session, saving a current state of the VFOQ as a whole and using the VFOQ to track the current backup state of each of the plurality of file objects, and saving the current backup state of each of the plurality of file objects in a respective child ISR of that file object; and
during a subsequent backup session, resuming backup of the plurality of file objects based on the current backup state of each of the plurality of file objects as indicated by the VFOQ.

2. The method of claim 1, wherein resuming backup of the plurality of file objects comprises:
identifying, based on the VFOQ, one or more file objects that were not completely backed up during the first backup session; and
instructing the child ISR for each of the one or more file objects to enforce their saved current backup state on the corresponding file object.

3. The method of claim 2, further comprising:
receiving an acknowledgement that a file object was received by the target device; and
in response to receiving the acknowledgement, updating a current backup state of the file object in the VFOQ to indicate that the file object has been successfully backed up.

4. The method of claim 3, further comprising:
in response to updating a current backup state of the file object in the VFOQ to indicate that the file object has been successfully backed up, terminating a child ISR corresponding to the file object.

5. The method of claim 4, further comprising:
in response to determining that all child ISRs have been terminated, terminating the parent ISR.

6. The method of claim 1, wherein the current backup state of a file object corresponds to a backup process the file object is currently undergoing.

7. The method of claim 1, wherein the VFOQ is generated and monitored by the parent ISR.

8. A system comprising:
a memory to store a plurality of objects to be backed up on a target device during a first backup session; and
a processor to:
receive a plurality of file objects to be backed up on a target device during a first backup session;
start a parent interrupt service routine (ISR), wherein the parent ISR generates a plurality of child ISRs, each of the plurality of child ISRs to monitor a backup state of a corresponding file object among the plurality of file objects;
generate a virtual file object queue (VFOQ) to store a current backup state of each of the plurality of file objects;
in response to detecting an abort of the first backup session, save a current state of the VFOQ as a whole and use the VFOQ to track the current backup state of each of the plurality of file objects, and save the current backup state of each of the plurality of file objects in a respective child ISR of that file object; and
during a subsequent backup session, resume backup of the plurality of file objects based on the current backup state of each of the plurality of file objects as indicated by the VFOQ.

9. The system of claim 8, wherein to resume backup of the plurality of file objects, the processor is to:
identify, based on the VFOQ, one or more file objects that were not completely backed up during the first backup session; and
instruct the child ISR for each of the one or more file objects to enforce their saved current backup state on the corresponding file object.

10. The system of claim 9, wherein the processor is further to:
receive an acknowledgement that a file object was received by the target device; and
in response to receiving the acknowledgement, update a current backup state of the file object in the VFOQ to indicate that the file object has been successfully backed up.

11. The system of claim 10, wherein the processor is further to:
in response to updating a current backup state of the file object in the VFOQ to indicate that the file object has been successfully backed up, terminate a child ISR corresponding to the file object.

12. The system of claim 11, wherein the processor is further to:
in response to determining that all child ISRs have been terminated, terminate the parent ISR.

13. The system of claim 8, wherein the current backup state of a file object corresponds to a backup process the file object is currently undergoing.

14. The system of claim 8, wherein the processor generates and monitors the VFOQ using the parent ISR.

15. A non-transitory computer readable medium, having instructions stored thereon that, when executed by a processor, cause the processor to:
receive a plurality of file objects to be backed up on a target device during a first backup session;
start a parent interrupt service routine (ISR), wherein the parent ISR generates a plurality of child ISRs, each of the plurality of child ISRs to monitor a backup state of a corresponding file object among the plurality of file objects;
generate a virtual file object queue (VFOQ) to store a current backup state of each of the plurality of file objects;
in response to detecting an abort of the first backup session, save a current state of the VFOQ as a whole and use the VFOQ to track the current backup state of each of the plurality of file objects, and save the current backup state of each of the plurality of file objects in a respective child ISR of that file object; and
during a subsequent backup session, resume backup of the plurality of file objects based on the current backup state of each of the plurality of file objects as indicated by the VFOQ.

16. The non-transitory computer readable medium of claim 15, wherein to resume backup of the plurality of file objects, the processor is to:
identify, based on the VFOQ, one or more file objects that were not completely backed up during the first backup session; and
instruct the child ISR for each of the one or more file objects to enforce their saved current backup state on the corresponding file object.

17. The non-transitory computer readable medium of claim 16, wherein the processor is further to:
receive an acknowledgement that a file object was received by the target device; and
in response to receiving the acknowledgement, update a current backup state of the file object in the VFOQ to indicate that the file object has been successfully backed up.

18. The non-transitory computer readable medium of claim 17, wherein the processor is further to:
in response to updating a current backup state of the file object in the VFOQ to indicate that the file object has been successfully backed up, terminate a child ISR corresponding to the file object.

19. The non-transitory computer readable medium of claim 18, wherein the processor is further to:
in response to determining that all child ISRs have been terminated, terminate the parent ISR.

20. The non-transitory computer readable medium of claim 15, wherein the current backup state of a file object corresponds to a backup process the file object is currently undergoing.

* * * * *